Patented July 6, 1943

2,323,584

UNITED STATES PATENT OFFICE 2,323,584

UNSATURATED DEGRADATION PRODUCTS OF STEROLS AND A METHOD OF PRODUCING THE SAME

Walter Schoeller, Berlin-Westend, Arthur Serini, Berlin, Friedrich Hildebrandt, Hohen-Neuendorf, near Berlin, Lothar Strassberger, Berlin-Wilmersdorf, Josef Kathol, and Willy Logemann, Berlin, Germany, assignors, by mesne assignments, to Schering Corporation, Bloomfield, N. J., a corporation of New Jersey No Drawing. Application September 19, 1935, Serial No. 41,202. In Germany September 29, 1934

43 Claims. (Cl. 260—397.4)

This invention relates to valuable degradation products of sterols and more particularly to the production of neutral unsaturated polycyclic ketones from sterols containing at least one double bond in their cyclopentano polyhydro phenanthrene nucleus.

One object of the present invention is to provide a method whereby unsaturated sterols, i. e. sterols which have at least one double bond in their cyclopentano polyhydro phenanthrene nucleus, are oxidized so as to produce neutral unsaturated polycyclic ketones which still contain the cyclopentano polyhydro phenanthrene nucleus of the sterol.

An other object of the present invention is to provide a method whereby the neutral unsaturated polycyclic ketones produced by the oxidation of said unsaturated sterols are separated from the reaction mixture.

Furthermore it is an object of the present invention to provide a method whereby from the neutral unsaturated polycyclic ketones produced by the oxidation of said unsaturated sterols and separated from the oxidation mixture, individual compounds are obtained.

A still further object of this invention consists in the conversion of the unsaturated hydroxy ketones obtained into valuable compounds by hydrogenation whereby the double bond in the ring system is saturated and/or the keto group is reduced to a secondary alcohol group.

Various other objects and advantages of the invention will appear as the description proceeds.

The valuable degradation products obtainable according to the present invention contain substantially substances which correspond more particularly to the structural formula

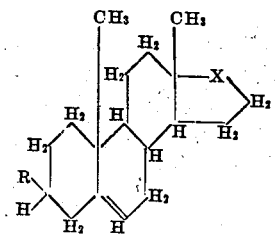

wherein R indicates —OH or a group which, upon hydrolysis, is converted into a hydroxy group, such as O-acyl, O-alkyl, O-aryl or halogen, and X either

or the group

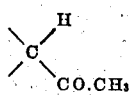

and hence, represent compounds of the $C_{19}$- and the $C_{21}$-series. Thus for instance, from the neutral oxidation products of the reaction mixture a dehydro-androsterone or its derivatives of the general formula $C_{19}H_{27}OR$ and the structural formula

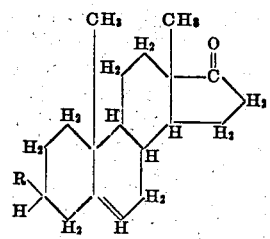

R=OH, O-acyl, O-alkyl, O-aryl or halogen and a pregnenolone or its derivatives of the general formula $C_{21}H_{31}OR$ and the structural formula

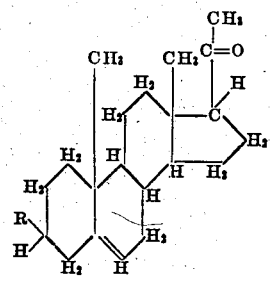

R as above can be isolated.

The dehydro-androsterone of the formula $C_{19}H_{28}O_2$ and its hydroxy derivatives which, upon hydrolysis, are converted into dehydro-androsterone, are identical with the dehydro-androsterone of the same formula and its derivatives described by Butenandt in Zeitschrift fuer physiol. Chemie, vol. 229 (1934), page 192; while the pregnenolone of the formula $C_{21}H_{32}O_2$ can readily be converted into pregnendione, the corpus luteum hormone, for instance, by way of the bromine compound by oxidation according to the copending application Serial No. 34,599, filed on August 3, 1935.

As starting materials for the present invention unsaturated sterols are used which contain at least a double bond in their cyclopentano polyhydro phenanthrene nucleus, as, for instance, cholesterol, phytosterol, stigmasterol, sitosterol, cinchol, and the like.

According to the present invention the degradation of these sterols is effected by oxidizing agents which are capable of splitting up —C—C-bonds, as, for example, chromium trioxide, permanganates or the like, the present invention being based on the fact that the long side chain of the sterol molecule is broken down by the oxidation process. This oxidation procedure takes place in suitable solvents at low temperatures, i. e. preferably below 70° C. Although, as above described, sterols containing at least one double bond in their cyclopentano polyhydro phenanthrene nucleus many be treated (directly) with an oxidizing agent of the type above defined to produce neutral degradation products having a cyclopentano polyhydro phenanthrene nucleus, it is advisable to protect from oxidation the double bond and preferably also the hydroxy group present in the cyclopentano polyhydro phenanthrene nucleus of the sterols.

The intermediate protection of the double bond can be carried out by the addition of halogen, for instance, of chlorine or bromine, or by the addition of halogen hydride, for instance, of hydrochloric acid. After oxidation the halogen added to the double bond is removed by means capable of re-establishing the double bond in the molecule, such as zinc dust, sodium amalgam, metallic nickel or the like, while the halogen hydride is split off by a treatment with alkaline agents, such as potassium hydroxide, pyridine, alkali acetate and the like. The hydroxy group of the sterols, if desired, may be protected from oxidation by esterification, etherification or conversion into a halogen group, i. e. by transformation into a group which, on hydrolysis or saponification, can be reconverted into the hydroxy group.

In order to separate the neutral oxidation products from the acid oxidation products the reaction mixture is treated, for instance, with an alkaline agent in a suitable medium which takes up the salts of the acid constituents of the oxidation mixture formed by said treatment, but not the neutral fraction. One may also proceed in such a manner, that the oxidation mixture is dissolved in or extracted with a suitable solvent whereupon the solution is treated or extracted with a suitable agent capable of forming salts with the acid constituents of the oxidation mixture, said salts or their solutions being insoluble in or not miscible with said solvent.

From the separated neutral fraction the unreacted starting material can be separated and the valuable neutral unsaturated polycyclic ketones can be isolated in various ways.

The isolation can be effected, for example, by making use of the different solubility of the various products of the neutral fraction in suitable solvents, i. e. by means of fractional crystallisation or precipitation. Thus, the separation of the hydroxy ketones of the $C_{19}$-series and the $C_{21}$-series on the basis of the different solubility of their esters has proved of value. In the case of the benzoate, for instance, it happens that the benzoate of the hydroxy ketone dehydro-androsterone of the formula $C_{19}H_{28}O_2$ is a difficultly soluble compound while the benzoate of the hydroxy ketone pregnenolone of the formula $C_{21}H_{32}O_2$ is relatively more soluble.

A further separation process of the neutral compounds of the $C_{19}$-series from those of the $C_{21}$-series consists in subjecting them to distillation or sublimation in a high vacuum. By this means the lower molecular compounds of the $C_{19}$-series pass over first.

The ketones produced by the claimed process may also be separated and isolated from the oxidation mixture by combination with compounds capable of forming substances of different solubility. Thus, use is made of the different solubility properties of the ketone derivatives obtained on the precipitation of the neutral portion with ketone reagents, for example, with semi-carbazide, thiosemicarbazide, phenylhydrazine and the like. The ketones of the $C_{19}$-series form with ketone reagents in general more difficultly soluble compounds than the ketones of the $C_{21}$-series.

One manner of procedure is that all the carbonyl containing compounds are precipitated from the neutral portion and then the isolated ketone compounds are fractionally crystallized. By means of this process it is possible in the simplest manner to obtain the most difficultly soluble portion in relatively pure form. The more easily soluble portion in general, however, still constitutes a mixture of different carbonyl-containing oxidation products and can be further purified in a suitable manner, for example, by subsequent precipitation by the addition of water or the like.

Another manner of procedure is that the most difficultly soluble ketone compound is precipitated by fractional precipitation with ketone reagents; this compound, which belongs to the $C_{19}$-series, is separated from the remaining solution and from the latter the more easily soluble ketone compounds are separated in a suitable manner.

The described separation methods can be employed alone as such; advantageously, however, they are combined together in a suitable manner and by this means there are obtained as end products both the dehydro-androsterone $C_{19}H_{28}O_2$ and also the pregnenolone in pure form.

A particularly useful process consists in combining the method described first with the last mentioned method; for this purpose the hydroxy ketones of the $C_{19}$- and $C_{21}$-series are first precipitated from the neutral fraction by means of ketone reagents, these are split up and the hydroxy ketones obtained are then esterified, for instance, with benzoyl chloride. Thereupon the esters are separated by fractional crystallisation.

The conversion of the unsaturated hydroxy ketones into valuable hydrogenation products is carried out by subjecting said compounds or their derivatives to the action of agents which are capable of hydrogenating the double bond in the ring system and/or reducing the keto group to a secondary alcohol group. Thus, for instance, the dehydro-androsterone of the general formula $C_{19}H_{27}OR$ and the structural formula

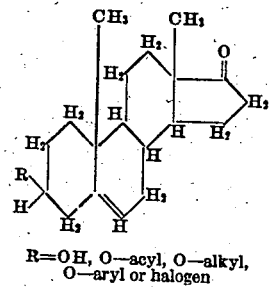

R=OH, O—acyl, O—alkyl, O—aryl or halogen by the addition of one molecule of hydrogen according to the reaction conditions employed, an androstanolone of the general formula $C_{19}H_{29}OR$ and the structural formula

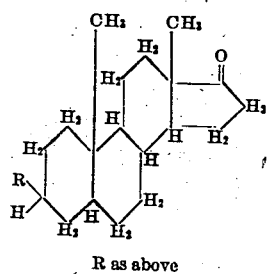

R as above or an androstendiol of the same general formula $C_{19}H_{29}OR$ having, however, the structural formula

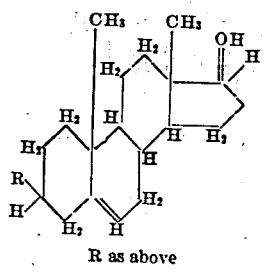

R as above is obtained while by the addition of two molecules of hydrogen and androstandiol of the general formula $C_{19}H_{31}OR$ and the structural formula

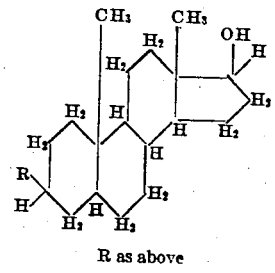

R as above is formed.

The following examples serve to illustrate the invention without, however, limiting the same to them:

Example 1

To a solution of 100 g. of stigmasterol acetate in 2,000 ccs. of carbon tetrachloride, a solution of 35.2 g. bromine in 1,000 ccs. of carbon tetrachloride is added in the course of ½ hour, while stirring and cooling to 15–10°. After this, the bulk of the solvent is evaporated under reduced pressure, so that about 550 ccs. of carbon tetrachloride remain. This solution of aceto stigmasterol dibromide is mixed with 3,500 ccs. of glacial acetic acid and warmed to about 45° C. To this mixture, a solution of 207 g. of chromic acid anhydride in 135 ccs. of water and 750 ccs. of glacial acetic acid, is added gradually during a period of several hours, with stirring. Stirring is continued for 30 hours at a temperature of 45° C. To destroy the excess chromic acid about 180 ccs. of methyl alcohol are added. Then the carbon tetrachloride is completely evaporated off under reduced pressure, and the glacial acetic acid partly, so that about 1,750 ccs. of glacial acetic acid remain. The residue is cooled with iced water and 180 g. of zinc dust are added in small quantities, while stirring. Stirring is then continued for a further period of 8 hours at room temperature and the whole poured into ten liters of water. The precipitate so produced is taken up with ether, the zinc dust filtered out and the ethereal solution is washed with water to remove acetic acid. The ethereal solution is then shaken with 400 ccs. of 2 n sodium hydoxide in order to remove the acid oxidation products. The ethereal solution is then dried with anhydrous magnesium sulphate and evaporated. The residue is then dissolved in 270 ccs. of boiling methyl alcohol. On cooling, the unchanged stigmasterol acetate crystallises out (8.5 grams). The methyl alcohol mother liquid is evaporated to about 50 ccs., a methyl alcoholic solution of semicarbazide acetate, consisting of 10 g. semicarbazide hydrochloride, 10 g. potassium acetate, and 50 ccs. of methyl alcohol, is added and the whole heated under reflux on a water bath for one hour. After standing for 12 hours at room temperature, the whole is filtered and 8.5 g. of semicarbazone is obtained, having a melting point of about 267° C. By recrystallisation from chloroform, about 5 g. of pure semicarbazone is obtained, which has a melting point of 280° C. On heating for 2 hours with 200 ccs. of an aqueous alcoholic solution of sulphuric acid, containing 75% alcohol, 15% water, and 10% concentrated sulphuric acid, all by volume, practically the whole of the theoretical yield of dehydroandrosterone of the general formula $C_{19}H_{28}O_2$ is obtained, having the melting point of 148–150° C.

The mother liquor, from which the semicarbazone was obtained by crystallisation from chloroform, is partly evaporated and, while hot, is mixed with methanol. In this way about 2 g. of a semicarbazone of a melting point 255–259° C. is obtained and this is split in the same manner as the former. The product so obtained is viscous, and on treatment with ether deposits crystals. By crystallisation from ether, a further yield of dehydroandrosterone is obtained. The ethereal mother liquor is evaporated to dryness and the residue crystallised and recrystallised from acetone until a melting point of 190° C. is obtained. This substance of melting point 190° C. and the general formula $C_{21}H_{32}O_2$ proves to be pregnenolone on analysis and by taking the melting point of the mixture; by means of oxidation, for instance, according to the process of the above mentioned copending application Serial No. 34,599, it can be transformed into pregnendione of the general formula $C_{21}H_{30}O_2$, the corpus luteum hormone.

The separation of the semicarbazones of the compounds of the $C_{19}$-series and the $C_{21}$-series from each other and the isolation of the various compounds may also be effected in the following manner:

The alcoholic mother liquor obtained after the precipitated semicarbazone of the melting point of about 267° C. has been filtered off, is treated with so much petrol ether that two layers are formed. Thereupon so much water is added to the mixture that no further separation takes place. The addition of water effects precipitation of the semicarbazones which are still in solution while any sterol starting material and other impurities which may be present remain dissolved in the petrol ether. The supernatant mother liquor is decanted from the precipitate, the latter is dissolved again in exactly the necessary quantity of alcohol and the described precipitation with petrol ether and water repeated. The semicarbazone mixture thereby obtained, is dried and triturated with ether. By this means the more easily soluble semicarbazones and also other impurities still present pass into the ether and are removed therewith. The remaining purified semicarbazone is split in the customary manner and subjected to a subsequent saponification. There is thus obtained a solid mass which after solution in pyridine is benzoylated in the customary manner. The benzoyl compound obtained is boiled with alcohol whereby any dehydroandrosterone benzoate present remains undissolved and from which the liquid is filtered. The alcoholic filtrate is treated while hot with water until the separation of an oil takes place. After the addition of animal charcoal and boiling, the whole is filtered hot. On cooling there then separates the pregnenolone benzoate in fine needles. By saponification with 5% methylalcoholic caustic potash lye there is obtained therefrom the free pregnenolone, which is purified by recrystallisation from dilute alcohol. The melting point of the pure product is then 190° C.

*Example 2*

A solution of the dibromide in carbon tetrachloride and glacial acetic acid prepared from 100 g. of stigmasterol acetate according to Example 1, is treated with a solution of 380 g. of calcium permanganate in 50 g. of water and 950 g. glacial acetic acid in a manner corresponding to the procedure in Example 1. After filtering out the deposited manganese dioxide the filtrate is freed from carbon tetrachloride as in Example 1, treated with zinc dust and the procedure is followed in exactly the same manner. The neutral oxidation products are caused to react with semicarbazide acetate. On splitting the semicarbazones, the same oxyketones are obtained as described in Example 1.

*Example 3*

35 grams of cholesterol acetate dibromide are dissolved in 1,750 ccs. of glacial acetic acid at 45° C. Then 52.5 grams of chromic acid dissolved in 35-50 ccs. of water and 200 ccs. of glacial acetic acid, are added drop by drop within six hours at a temperature of 45° C. Finally the solution is allowed to stand for a further 12 hours at room temperature. The excess of chromic acid is destroyed with methyl alcohol and the glacial acetic acid evaporated in vacuum at 45° C. The residue is treated with dilute sulphuric acid and, after the addition of water, exhaustively extracted with ether. The ether solution is separated by extraction with 1 n caustic soda lye into an acid and a neutral constituent.

After drying and evaporation of the ether layer there is obtained as neutral constituent 15 grams; the acid constituent amounts to 12.8 grams. The neutral constituent is treated in glacial acetic acid with double the weight of zinc dust at 45° C. and thereupon heated for a further 1½ hours at 100° C. After filtration the product is treated with water, extracted with ether and the ether washed with 2 n caustic soda lye in order to remove any acid constituents still present. The ether residue is triturated with 50 ccs. of alcohol and heated to the point of solution. After cooling to 0° C. the cholesterol acetate which crystallises out, is filtered off. The evaporated remaining mother liquors (6.5 grams) are treated with 6 grams of semicarbazide acetate and slightly heated. A semicarbazone is produced in a quantity of about 1 gram which can be recrystallised from chloroform-methyl alcohol. Melting point 280° C. with decomposition. The semicarbazone is split up with aqueous oxalic acid or mineral acid and the product of splitting saponified with alcoholic caustic lye. In this manner is obtained the unsaturated hydroxy ketone of the formula $C_{19}H_{28}O_2$ and the melting point 148° C.

0.5 gram of the unsaturated hydroxy ketone is dissolved in 75 ccs. of hot alcohol and reduced by the gaduual addition of about 3 grams of sodium metal. After the sodium is dissolved, the solution is poured into water and extracted with ether. The ether residue is freed from unchanged original material, by warming with an alcoholic solution of semicarbazide acetate. Water is added to the filtrate from the semicarbazone and the whole extracted with ether. By evaporation of the ether, an unsaturated diol of the formula $C_{19}H_{30}O_2$ is obtained, which after crystallisation from dilute alcohol, is found to have a melting point of about 173° C.

*Example 4*

300 grams of sitosterol acetate dibromide obtained, for instance, by bromination of the acetates of the sterols present in soya bean oil and separation from the accompanying tetrabromo stigmasterol acetate according to Bonstedt, Zeitschrift für physiologische Chemie 176, p. 269 (1928), are dissolved in 8,000 ccs. of glacial acetic acid and 200 ccs. of carbon tetrachloride at about 40° C. and at this temperature treated with stirring during 5 hours with a solution of 450 grams of chromic acid in 277 ccs. of water and 1,350 ccs. of glacial acetic acid. After about 24 hours duration of oxidation the unconsumed chromic acid is destroyed with 200 ccs. of methanol and the glacial acetic acid distilled off in vacuum at about 40° C. The residue is treated with water and 700 grams of sulphuric acid and repeatedly extracted with ether. From the ethereal solution the acid constituents are removed with 10% caustic potash lye, and it is dried with magnesium sulphate and the ether driven off at 30° C.

The residue from the ethereal solution is dissolved in 750 ccs. of glacial acetic acid, the solution treated with 200 grams of zinc dust and after standing over night heated for 2½ hours to 100° C. with brisk stirring. After cooling, the residue is filtered with suction, well washed with glacial acetic acid and the filtrate poured into 4-5 litres of water. The mass which thereby separates is taken up in ether and the ether solution shaken with caustic lye and dried. The residue remaining after evaporation of the ether is triturated with 200 ccs. of alcohol; unchanged starting material remains undissolved and is removed by filtration. The filtrate is treated with a solution of semicarbazide acetate (from 20 grams of semicarbazide hydrochloride and 20 grams of potassium acetate) and heated for 1 hour to boiling. The crystal mass separating after 24 hours standing is filtered with suction and well washed consecutively with alcohol, petrol ether and water.

Yield of crude substance: 8 grams of decomposition point about 250° C. After recrystallisation from alcohol and chloroform the decomposition point amounts to 280° C.; yield of pure semicarbazone=5 grams.

5 grams of semicarbazone are thereupon heated with 200 ccs. of a mixture of 75 ccs. of ethanol (96%), 10 ccs. concentrated sulphuric acid and 15 ccs. of water to boiling for 40 minutes. The whole is rapidly cooled, poured into 1 litre of water, extracted with ether and the ethereal solution extracted with caustic lye. The residue from the ethereal solution is for the purpose of subsequent saponification heated with excess of 3% methylalcoholic caustic lye for 1 hour under reflux. The whole is poured into water, extracted with ether, the ethereal solution dried with magnesium sulphate, the ether evaporated off and the residue crystallised from dilute alcohol or ether. Thus, about 3.5 grams of an unsaturated hydroxy ketone of the general formula $C_{19}H_{28}O_2$ and the melting point 144–145° C. in the shape of small needles are obtained. 1 gram of the unsaturated hydroxy ketone is dissolved in 50 ccs. of glacial acetic acid and is treated with hydrogen in the presence of 0.2 gram of platinum oxide catalyst until two mols of hydrogen have been taken up. After hydrogenation the solution is filtered free from catalyst and poured into water. The mixture is extracted with ether and the ether residue saponified with alcoholic lye. The reaction liquid is again poured into water and extracted with ether. The ether residue can be purified by crystallisation from dilute alcohol, ethyl acetate or similar solvents. The melting point of the androstandiol of the general formula $C_{19}H_{32}O_2$ thus obtained, is approximately 162° C.

*Example 5*

180 grams of methoxy cholesterol is dissolved in 300 ccs. of carbon tetrachloride and the solution is mixed with 72 grams of bromine dissolved in 500 ccs. of carbon tetrachloride, with stirring during the course of 2–3 hours and at a temperature of 5°. Then 6.7 litres of glacial acetic acid are added and the temperature raised to 40–45° C. To the solution so obtained, 378 grams of chromic acid dissolved in 1.3 litres of glacial acetic acid and 0.2 litre water, are added during the course of 22 hours, with stirring. After 2½ days, the greater part of the chromic acid is used up. After distilling off 5 litres of glacial acetic acid the remaining reaction solution is poured into 15 litres of water, allowed to stand over night and then filtered. To the precipitate 6 litres of water and 7 litres of ether are added and the mixture thoroughly shaken. The supernatant ether layer is removed and shaken with one litre of 2 n potassium hydroxide solution to remove acid oxidation products. 100 grams of residue remain after the ether has been evaporated off. This is taken up in 1.6 litres of glacial acetic acid and debrominated with 160 grams zinc dust at a temperature of 100° C. for one hour. The reaction products are poured into water and extracted with ether. The alcoholic solution of the residue obtained after evaporation of the ether, is treated with an alcoholic solution of semicarbazide acetate whereby about 18 grams of impure semicarbazone are precipitated. The mother liquor obtained after the semicarbazone has been filtered off is extracted with petroleum ether; on treating the residue insoluble in the petroleum ether, with water, further 20 grams of semicarbazone are obtained, 5 grams of which are ether-insoluble. The semicarbazone which is difficultly soluble in petroleum ether, ether and alcohol, may be crystallised from chloroform-methanol (1:1) and then melts at 244°. By splitting the semicarbazone the methyl ether of the unsaturated oxyketone of the formula $C_{19}H_{28}O_2$ is obtained.

*Example 6*

130 grams of dibromo cholesterol benzoate are dissolved in 4½ litres of glacial acetic acid and 400 ccs. of carbon tetrachloride. To this solution is dropped a solution of 180 grams of chromic acid in 150 ccs. of water and 1 litre of glacial acetic acid, during a period of 40 hours and keeping the temperature constant at 45–50° C. Further procedure is the same as described under Example 3. The whole of the debrominated neutral product is treated repeatedly with petroleum ether, whereby the unchanged cholesterol benzoate goes into solution, while the benzoate of the oxyketone $C_{19}H_{28}O_2$ remains undissolved. The latter is crystallised from alcohol and chloroform and saponified for 3 hours with a 5% methyl alcoholic caustic potash solution. Colourless needles melting at 148° C. are obtained on crystallisation with ether.

From the mother liquor of the isolation and that of purification of the benzoate of the oxyketone $C_{19}H_{28}O_2$, the semicarbazone of pregnenolone benzoate can be obtained by using semicarbazide as described in Example 1.

*Example 7*

100 grams of cholesterol acetate are dissolved in 800 ccs. of absolute ether, and 500 ccs. of glacial acetic acid added. Dry hydrogen chloride gas is passed into the solution for 2 days. After cooling in ice the precipitate is filtered off and washed with cold methanol. The yield is about 75 grams of aceto cholesterol hydrochloride having a melting point of 146° C. From the mother liquor a further 30 grams of less pure aceto cholesterol hydrochloride is obtained and this can be purified by crystallisation from chloroform-methanol.

50 grams aceto cholesterol hydrochloride are mixed with 200 ccs. of carbon tetrachloride and 1.5 litres glacial acetic acid. At a temperature of 35–45° C., a solution of 75 grams of chromium trioxide in 40 ccs. of water and 280 ccs. of glacial acetic acid is dropped into the mixture within a period of 2 days. The temperature is maintained until the greater part of the chromium trioxide is used up. The rest of the oxidising agent is eliminated by the addition of methanol. The carbon tetrachloride is evaporated off in vacuum and the resultant liquid poured into water. The precipitate thrown out is filtered off and dissolved in ether. The ethereal solution is split into its acid and neutral constituents by means of 1 n potassium hydroxide solution. The neutral portion, containing about 20 grams of organic substance, is boiled with 10 grams caustic potash in 300 ccs. of methyl alcohol for 4½ hours. It is then acidified with 2 n sulphuric acid and extracted with ether. The residue remaining after the ether has been evaporated, is treated with 5 grams of semicarbazide acetate in 50 ccs. of alcohol and warmed on a water bath for one hour. After standing 12 hours, the deposited precipitate is thoroughly washed with water, alcohol, ether and finally with petroleum ether. About 0.6–1 gram of a semicarbazone is obtained, which yields by suitable splitting, an unsaturated oxyketone of the formula $C_{19}H_{28}O_2$. One gram of the unsaturated oxyketone is dissolved in 30 ccs. of glacial acetic acid and treated with hydrogen at room temperature in the presence of 0.3 gram of platinum black until one mol of hydrogen has been taken up. After filtration from catalyst, the solution is poured into water and the reduction product is taken up with ether. The ethereal solution is then washed with dilute alkaline lye and with water. The ether is evaporated off and the residue crystallised from dilute alcohol. By this hydrogenation a saturated oxyketone of the general formula $C_{19}H_{30}O_2$, the trans-androsterone, having a melting point of 170° C., is obtained.

In the same way the acetate of the unsaturated oxyketone $C_{19}H_{28}O_2$ can be hydrogenated yielding the acetate of the trans-androsterone having a melting point of 117–118° C. By saponification with 5% methyl alcoholic caustic potash lye the trans-androsterone of the melting point 170° C. is obtained.

Example 8

Cholesterol acetate hydrochloride is oxidised in a mixture of glacial acetic acid and carbon tetrachloride by means of chromic acid in the same manner as described in Example 7; the ether solution then obtained is separated by means of n-caustic soda lye into an acid and a neutral constituent. The latter is now treated not with zinc dust and glacial acetic acid as in Example 7, but is boiled in pyridine solution for the splitting off of the hydrochloric acid. The pyridine solution is then poured into dilute sulphuric acid, the separated acetate taken up with ether and worked up as in Example 7 to an unsaturated hydroxy ketone of the general formula $C_{19}H_{28}O_2$. 1.5 grams of the unsaturated hydroxy ketone is dissolved in 45 ccs. of alcohol and in the presence of 0.5 gram of platinum oxide catalyst treated at a temperature of 40–50° C. with hydrogen until 1 mol of hydrogen has been taken up. After filtration from catalyst, the reduction product is precipitated with water and taken up with ether. The ether residue is crystallised from dilute alcohol. The same unsaturated diol of the general formula $C_{19}H_{30}O_2$ and the melting point 173° C. is obtained as in Example 3. The melting point of the mixture shows no depression. The diol adds the theoretical amount of bromine as required by an ethylene group.

Example 8a 100 grams of sitosterol acetate dibromide obtained according to Example 4, are thoroughly mixed with 3 liters of glacial acetic acid at room temperature whereby complete solution does not take place. Thereupon, while stirring, a solution of 100 grams of chromic acid anhydride in 50 ccs. of water and 1 liter of glacial acetic acid is added and the stirring is continued for 2 hours whereby the starting material is completely dissolved. On allowing the solution to stand for 12 hours at room temperature, it has changed to a greenish color. Then, it is poured into ice water, the precipitate is dissolved in ether, the ethereal solution shaken with water and evaporated to dryness in a vacuum. The residue is dissolved in 1 liter of glacial acetic acid, 100 grams of zinc dust are added to this solution and the mixture heated for 1 hour to boiling. After filtering off the zinc dust, not-reacted sitosterol acetate crystallizes out on cooling and is filtered off by suction. The filtrate is evaporated to dryness in a vacuum, the residue is dissolved in alcohol and mixed with an alcoholic solution of semicarbazide acetate. A semicarbazone is precipitated, filtered off and washed with water, petroleum ether and ether. Its decomposition point is at about 276° C. On splitting this product, dehydro androsterone of the melting point 148° C. is obtained.

Example 9

50 grams of cholesteryl chloride are dissolved in 400 grams of carbon tetrachloride and gradually added with cooling, to a solution of 20 grams of bromine in 200 grams of carbon tetrachloride. The resulting solution is washed with sodium carbonate solution and with water until neutral, and is evaporated in vacuum to about 200 grams. The residue is mixed with 3 kilograms of glacial acetic acid and to the mixture at 40° C. during the course of one hour a solution of 120 grams chromic acid anhydride in 60 grams of water and 300 grams of glacial acetic acid is added, while stirring. The stirring is continued for 20–30 hours at 40° C. until the greater part of the oxidising agent is spent. The rest of the chromic acid is destroyed by adding 50 ccs. of methanol. The mixture is then evaporated in vacuum to half its volume to remove the remaining carbon tetrachloride, a large part of the glacial acetic acid remaining in the residue. The residue is cooled to 5–10° C. and 40 grams of zinc dust added; thereby only a slight increase in temperature takes place. The mixture is stirred with the zinc for 24 hours. The solution is filtered free from undissolved zinc and then poured into plenty of water. The precipitate is taken up in ether; the ethereal solution is then washed successively with dilute sulphuric acid, solution of sodium hydroxide and water and evaporated to dryness. The residue is warmed with an alcoholic solution of semicarbazide acetate on a water bath for one hour; after cooling the semicarbazone is filtered off and purified by solution and precipitation from chloroform-alcohol. The pure semicarbazone melts at 275°. By heating with dilute alcoholic sulphuric acid, an unsaturated chloroketone with a melting point of 157° is obtained. For the conversion into the corresponding unsaturated hydroxy ketone this chloro compound is heated in alcoholic or acetic acid solution with potassium acetate in a bomb tube for 6 to 8 hours to 180–200° C. After cooling, the reaction mass is washed out of the bomb tube by means of water and the aqueous solution is extracted with ether. From the ether there is obtained, after evaporating the solvent, a mixture of compounds from which the acetate of the unsaturated hydroxy ketone of the general formula $C_{19}H_{28}O_2$ can be isolated by fractional crystallisation from methanol. By saponification, the unsaturated hydroxy ketone of the general formula $C_{19}H_{28}O_2$ is produced.

In the above given examples many changes and variations may be made by those skilled in the art. Thus, in the place of compounds in which the hydroxy group is free or substituted by the O-acetyl or O-benzoyl group, by the methoxy group or by chlorine as in the above examples, substances may be used as starting materials for carrying out the various steps of the reactions in which the hydroxy group is replaced, for instance, by the O-succinyl or O-phthalyl, or any other O-acyl group, by the ethoxy group or any other aroxy or alkoxy group or by other substituents which can be converted into the hydroxy group. The conversion of the esters or ethers into the corresponding hydroxy compound is effected by the known methods of saponification or hydrolysis while the transformation of the halogen substituent into the hydroxy group can be carried out, instead of working according to Example 9, by causing the halogen compound to react with salts of other organic carboxylic or sulfonic acids, such as silver acetate, potassium benzoate or the like. Thereby the esters are obtained which, on saponification, yield the corresponding hydroxy compounds.

The oxidation is preferably carried out by means of chromic acid anhydride; but, of course, other oxidation agents, such as other compounds of six-valent chromium, for instance, chromium oxychloride $CrO_2Cl_2$, bichromates in acid solution or the like, or potassium, calcium or other suitable permanganates and others more may be used, especially such agents as are capable of splitting up saturated —C—C bonds.

The amount of the various agents and the type and the amount of the solvents used in carrying out this invention may be varied within the limits known to those skilled in the art. For instance, instead of glacial acetic acid or carbon tetrachloride used in the above examples other solvents or solvent mixtures can also be taken which are not attacked by the oxidizing agent used. Quite generally it appears that considerable dilution of the reaction mixture is of advantage in the oxidation procedure. As to the temperature it may be altered too according to the principles of the present invention; nevertheless it is advisable not to raise the temperatures mentioned in the above examples too much; for, undesirable side reactions are likely to occur, for instance, during the oxidation procedure.

The double bond in the polycyclic ring system is not only re-established by treating the dihalogen compounds with those agents mentioned in the specification and the examples; but also other suitable methods may be used, such as treatment with sodium iodide in acetone according to Finkelstein, gentle treatment with hydrogen in the presence of catalysts, such as platinum or nickel, and of basic agents, without hydrogenation of the double bond taking place, or the like, as described, for instance, in Houben, Methoden der organischen Chemie, vol. 2, p. 301–304 (1922).

As ketone reagents for the separation and isolation of the neutral carbonyl containing compounds, besides semicarbazide, thiosemicarbazide, phenylhydrazine, also other substances may be employed which are capable of condensing with the keto group of the carbonyl-containing compounds, such as, for instance, hydroxylamine, the substitution products of phenylhydrazine, such as p-nitrophenyl hydrazine, p-bromo phenyl hydrazine, diphenylhydrazine and the like, benzhydrazides, quaternary ammonium acetohydrazides, such as trimethyl aceto hydrazide ammonium chloride, acethydrazide pyridinium chloride and the like, and other compounds known to the art. The decomposition of the compounds obtained by reaction with ketone reagents as, for instance, the splitting up of the semi-carbazones and the like may be made in the customary manner. In order to avoid saponification or hydrolysis of those condensation products wherein the hydroxy group is substituted as described above, the decomposition is carried out by gentle means, such as treatment with acid reagents in the presence of small amounts of water, and preferably also in the presence of a suitable solvent.

For the hydrogenation of the oxidation products obtained, hydrogen may be used which is catalytically activated by noble metal catalysts, such as platinum or its oxides, or by nickel or any other known catalysts, such as for instance, the Raney catalyst. Furthermore, one may employ hydrogen in statu nascendi as produced, for instance, by the action of acids on metals and the like or of an alkali metal on alcohols. The reduction can also be effected by heating the compounds to be reduced with substances capable of giving off hydrogen, such as, for instance, alcohols in the presence of alcoholates, or by causing the compounds to be reduced to react with such alkyl metal halides which are capable of forming olefines, such as for instance, isopropyl magnesium iodide and the like.

The products obtained by the various reaction steps can be isolated from the non-reacted starting materials as well as from isomers and by-products which may have been formed, and further purified by fractional and/or repeated crystallisation, distillation, sublimation or by any other method. Besides forming condensation products of different solubility by means of ketone reagents as mentioned above one may, for instance, produce other addition or condensation compounds of different solubility which, after separation by means of their different solubility characteristics are then decomposed.

The progress achieved by the present invention consists in that physiologically valuable products exhibiting the effects of sexular hormones or being readily convertible into compounds of such properties are thereby produced synthetically, whereas up to now such products, if at all, could only be isolated in small quantities from natural sources as urine, organs or the like. Thus, for instance, the unsaturated hydroxy ketones, of the general formula $C_{19}H_{28}O_2$ as obtained according to the above examples show the effects of the male sex hormones and have an activity of about 500–600 $\gamma$ C. U.; the same applies to the saturated hydroxy ketone of the general formula $C_{19}H_{30}O_2$ as obtained according to Example 7. The esters as, for instance, the acetates or benzoates which have also an activity of about 500 mg./C. U., are distinguished from the corresponding free alcohols by their activity being distributed over a relatively longer period of time.

Of course, various modifications and changes in the reaction conditions etc. may be made by those skilled in the art in accordance with the principles set forth herein and in the claims annexed hereto.

What we claim is:

1. Process for the production of neutral degradation products having a cyclopentano polyhydro phenanthrene nucleus, comprising oxidizing sterols containing at least one double bond in their cyclopentano polyhydro phenanthrene nucleus with agents capable of splitting a carbon-to-carbon bond at the side chain and separating the neutral portions of the resultant oxidation products containing the cyclopentano polyhydro phenanthrene nucleus.

2. Process for the production of neutral degradation products having a cyclopentano polyhydro phenanthrene nucleus, comprising oxidizing sterols containing at least one double bond in their cyclopentano polyhydro phenanthrene nucleus with agents capable of splitting a carbon-to-carbon bond at the side chain separating the neutral portions of the resultant oxidation products and isolating from such neutral portions the unsaturated polycyclic ketones formed by the oxidation.

3. Process for the production of neutral degradation products having a cyclopentano polyhydro phenanthrene nucleus, comprising oxidizing sterols containing at least one double bond in their cyclopentano polyhydro phenanthrene nucleus with oxidizing agents capable of splitting a carbon-to-carbon bond at the side chain, separating the neutral portions of the resultant oxidation products, isolating from such neutral portions the unsaturated polycyclic ketones formed by the oxidation and subjecting said unsaturated ketones to th action of hydrogenating agents.

4. Process for the production of neutral degradation products having a cyclopentano polyhydro phenanthrene nucleus, comprising oxidizing sterols containing at least one double bond in their cyclopentano polyhydro phenanthrene nucleus, with agents capable of splitting a carbon-to-carbon bond at the side chain, after the double bond of said sterols has been intermediately protected against oxidation by temporary saturation with substances capable of removal to restore the double bond, and separating the neutral portions of the resultant oxidation products.

5. Process according to claim 4 wherein the intermediate protection against oxidation of the double bond of the sterols is effected by the addition of a member of the group consisting of halogen, and hydrogen halide.

6. Process according to claim 4 wherein the intermediate protection against oxidation of the double bond of the sterols is effected by the addition of bromine.

7. Process according to claim 1, including the step of transforming the hydroxy group of said sterols, prior to the oxidation, into a group which, on hydrolysis, can be reconverted into the hydroxy group, whereby such hydroxy group is protected against oxidation.

8. Process according to claim 4, including the step of transforming the hydroxy group of said sterols, prior to the oxidation, into a group which, on hydrolysis, can be reconverted into the hydroxy group, whereby such hydroxy group is protected against oxidation.

9. Process according to claim 4 wherein the hydroxy group of said sterols is protected against oxidation by esterification.

10. Process for the production of neutral degradation products having a cyclopentano polyhydro phenanthrene nucleus, comprising treating sterols containing at least one double bond in their cyclopentano polyhydro phenanthrene nucleus, with chromic acid anhydride after temporarily converting an oxidizable portion of the sterol molecule, other than the side chain to be split off, into a form in which it resists oxidation and from which it can be reconverted into its original condition, and separating the neutral portions of the resultant oxidation products containing the cyclopentano polyhydro phenanthrene nucleus.

11. Process for the production of neutral degradation products having a cyclopentano polyhydro phenanthrene nucleus, comprising oxidizing sterols containing at least one double bond in their cyclopentano polyhydro phenanthrene nucleus, with agents capable of splitting a carbon-to-carbon bond at the side chain after temporarily converting an oxidizable portion of the sterol molecule, other than the side chain to be split off into a form in which it resists oxidation and from which it can be reconverted into its original condition, separating the neutral portions of the resultant oxidation products and isolating from such neutral portions the unsaturated polycyclic ketones formed by the oxidation.

12. Process according to claim 11 wherein the isolation treatment is effected by means of ketone reagents.

13. Process according to claim 11 wherein the isolation treatment is effected by condensing said ketones with ketone reagents, separating the condensation products formed from the unreacted neutral portions, recrystallising the separated condensation products and regenerating the free ketones from the fractions thus obtained, by treatment with hydrolizing agents.

14. Process according to claim 11 wherein the isolation treatment is effected by condensing said ketones with ketone reagents, separating the condensation products formed from the unreacted neutral portions, regenerating the free ketones from the condensation products by treatment with hydrolizing agents and separating from each other the free ketones thus obtained, by recrystallisation.

15. Process for the production of unsaturated ketones of the general formula $C_{18}H_{27}RX$ and the structural formula

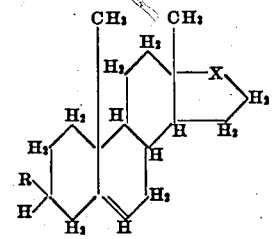

where R represents a member of the group consisting of the hydroxy group and groups which, on hydrolysis, are retransformed into a hydroxy group and X is a member of the group consisting of

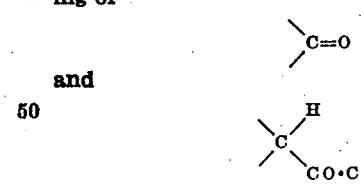

comprising oxidizing sterol compounds of the general formula $C_{19}H_{3}RY$ and the structural formula

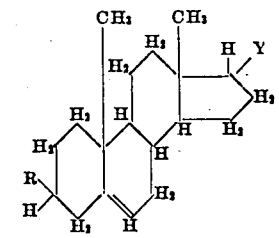

where Y is an aliphatic side chain, with agents capable of splitting a carbon-to-carbon bond at the side chain, separating the neutral portions of the resultant oxidation products and isolating from such neutral portions the unsaturated polycyclic ketones formed by the oxidation.

16. Process according to claim 15, including the step of temporarily saturating the double bond in the cyclopentano polyhydro phenanthrene nucleus of the said sterol compounds, prior to oxidation, with substances capable of removal to restore the double bond, whereby such double bond is protected against oxidation.

17. Process for the production of unsaturated ketones of the general formula $C_{19}H_{27}OR$ and the structural formula

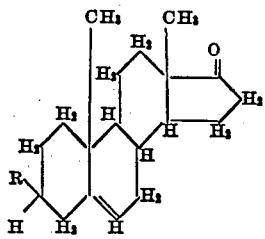

where R represents a member of the group consisting of the hydroxy group and groups which, on hydrolysis, are retransformed into a hydroxy group, comprising oxidizing sterol compounds of the general formula $C_{19}H_{28}RY$ and the structural formula

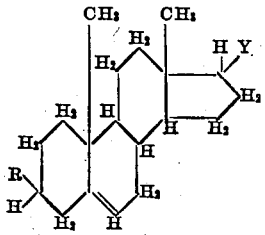

where Y is an aliphatic side chain, with agents capable of splitting a carbon-to-carbon bond at the side chain, separating the neutral portions of the resultant oxidation products and isolating from such neutral portions the unsaturated polycyclic ketones of the general formula $C_{19}H_{27}OR$ formed by oxidation.

18. Process according to claim 17, including the step of temporarily saturating the double bond in the cyclopentano polyhydro phenanthrene nucleus of the said sterol compounds, prior to oxidation, with substances capable of removal to restore the double bond, whereby such double bond is protected against oxidation.

19. Process according to claim 2 wherein, before isolating the unsaturated polycyclic ketones formed by the oxidation, the unreacted starting material is separated from the neutral portions.

20. Process according to claim 2 wherein the isolating treatment consists in causing the unsaturated polycyclic ketones to react with ketone reagents, separating the various fractions of the condensation products thus obtained, and regenerating the free ketones from the said condensation products by treatment with hydrolizing agents.

21. Process for the production of unsaturated cyclopentanodimethylpolyhydrophenanthrene compounds of the general structural formula

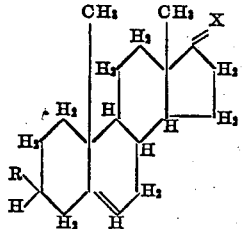

wherein R is a member of the group consisting of the hydroxy group and groups which on hydrolysis are re-transformed into the hydroxy group, and X is a member of the group consisting of $=O$ and

comprising oxidizing a sterol oxidation product of the general formula $C_{19}H_{28}RY$ and the structural formula

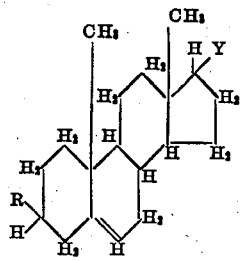

wherein Y is an aliphatic side chain, with an agent capable of splitting a carbon-to-carbon bond at the side chain, separating the neutral portions of the resulting oxidation products, and separating oxidation products having the general formula $C_{19}H_{27}OR$ from those having the general formula $C_{21}H_{31}OR$ by fractional crystallization.

22. Process according to claim 11, wherein the isolation treatment is effected by means of semicarbazide.

23. Process for the production of unsaturated cyclopentanodimethylpolyhydrophenanthrene compounds of the general structural formula

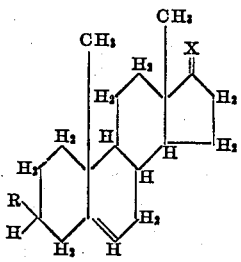

wherein R is a member of the group consisting of the hydroxy group and groups which on hydrolysis are re-transformed into the hydroxy group, and X is a member of the group consisting of $=O$ and

comprising oxidizing a sterol compound of the general formula $C_{19}H_{28}RY$ and the structural formula

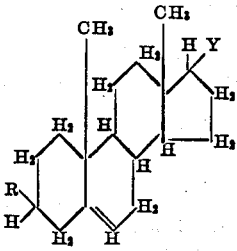

wherein Y is an aliphatic side chain, with an agent capable of splitting a carbon-to-carbon bond at the side chain, separating the neutral portions of the resulting oxidation products, and separating oxidation products having the general formula $C_{19}H_{27}OR$ from those having the general formula $C_{21}H_{31}OR$ by fractionation.

24. The process for the production of the chlor-ketone $\Delta_{5,6}$-3-chlor-etio-cholenone-(17) which comprises the oxidation of dibrom cholesteryl chloride with chromium trioxide in glacial acetic acid and subsequent debromination of the oxidation product with zinc in glacial acetic acid.

25. A process for the production of dehydro-androsterone from cholesterol comprising protecting the hydroxyl group of the cholesterol by acylation with acetic acid, protecting the double bond by bromination, treating the so-protected compound with chromic acid to replace the side chain with oxygen, and subsequently removing the acyl and halogen groups used for the protection of the hydroxyl group and the double bond.

26. In a process for producing dehydroandrosterone from cholesterol and structurally related compounds of the general formula

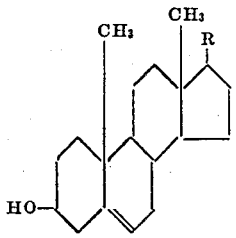

wherein R is an aliphatic or substituted aliphatic side chain of which the chain carbon atom attached to the carbon of the five-membered ring of the formula is secondary, the steps of first converting the sterol into its acyl ester, dihalogenating the compound at the double bond, subjecting the so-protected compound to the action of an oxidizing agent capable of replacing the side chain with oxygen, treating the oxidation product with a reagent capable of removing the halogen to restore the double bond, converting the dehalogenated product into its semi-carbazone, isolating the semi-carbazone, and recovering dehydroandrosterone therefrom.

27. In a process for producing dehydroandrosterone from cholesterol, the steps of first converting cholesterol into cholesteryl acetate dibromide, oxidizing the latter with an agent capable of replacing the side chain with oxygen, treating the oxidation product with a reagent capable of removing the halogen to restore the double bond, converting the debrominated substance into its semi-carbazone, isolating the semi-carbazone, and recovering dehydroandrosterone therefrom.

28. In a process for producing dehydroandrosterone from cholesterol the step which comprises treating cholesteryl acetate dibromide with $CrO_3$ to replace the side chain with oxygen.

29. A process for the production of substituted unsaturated polynuclear cyclic ketones, comprising treating an ester of a sterol containing a double bond in 5.6-position of the ring system with halogen to effect temporary saturation of the double bond, treating the halogenated ester with an oxidizing agent capable of replacing the said chain with oxygen, treating the oxidation product with an agent capable of removing the halogen to restore the double bond, and isolating the cyclic ketones from the neutral portion of the oxidation product.

30. A process for the production of substituted unsaturated polynuclear cyclic ketones, comprising treating an ester of cholesterol-dihalide with an oxidizing agent capable of replacing the side chain with oxygen, restoring the double bond at any stage after oxidation by treatment with an agent capable of binding halogen, and isolating the cyclic ketones from the non-volatile neutral oxidation products thus obtained.

31. The semi-carbazone of dehydro-androsterone acetate.

32. $\Delta^{5,6}$-androstendiol.

33. Process for the production of neutral degradation products having a cyclopentano polyhydro phenanthrene nucleus, comprising treating sterols containing at least one double bond in their cyclopentano polyhydro phenanthrene nucleus at temperatures below 70° C., with chromic acid anhydride after temporarily converting an oxidizable portion of the sterol molecule, other than the side chain to be split off into a form in which it resists oxidation and from which it can be reconverted into its original condition, and separating the neutral portions of the resultant oxidation products.

34. A process for the production of dehydroandrosterone from cholesterol comprising protecting the hydroxyl group of the cholesterol by acylation, protecting the double bond by halogenation, then subjecting the compound to the action of an oxidizing agent capable of replacing the side chain with oxygen, and subsequently reacting the product with a compound capable of replacing the acyl group with hydroxyl, and with a compound capable of splitting off the halogen groups to restore the double bond.

35. A process for the production of substituted unsaturated polynuclear cyclic ketones comprising treating compounds containing an unsaturated cyclopentano dimethyl polyhydro phenanthrene nucleus having in the 3-position a substituent capable of replacement upon hydrolysis by a hydroxyl group, and an aliphatic side chain of a plurality of carbon atoms at the 17-carbon, and wherein the nuclear double bond is temporarily saturated by a member of the group consisting of halogen and hydrogen halide, with an oxidizing agent capable of splitting off the aliphatic side chain and replacing it with ketonic oxygen, and reacting the product with a compound capable of splitting off the added halogen or hydrogen halide to restore the double bond, and isolating the neutral cyclic ketones so obtained.

36. In a process for the manufacture of pregnendione, the step which comprises oxidizing a sterol having a double bond attached to the 5-carbon with an agent capable of breaking down the side chain at the 17-position into a —$CO.CH_3$ group.

37. In a process for the manufacture of pregnendione, the step which comprises oxidizing a cholesterol with an agent capable of breaking down the side chain at the 17-position into a —$CO.CH_3$ group.

38. In a process for the manufacture of pregnendione, the step which comprises oxidizing a sterol having a double bond attached to the 5-carbon with an agent capable of breaking down the side chain at the 17-position into a —$CO.CH_3$ group with intermediate protection of the double bond.

39. In a process for the manufacture of pregnendione, the step which comprises oxidizing a cholesterol with an agent capable of breaking down the side chain at the 17-position into a —CO.CH₃ group with intermediate protection of the double bond.

40. The condensation product of a dehydroandrosterone ester with a ketone reagent.

41. The condensation product of a ketone reagent and dehydroandrosterone acetate.

42. The condensation product of a dehydroandrosterone ester with a ketone reagent selected from the class consisting of hydroxylamine, hydrazines and hydrazides capable of forming insoluble condensation products with ketones.

43. The condensation product of a ketone reagent selected from the class consisting of hydroxylamine, hydrazines and hydrazides capable of forming insoluble condensation products with ketones, with dehydroandrosterone acetate.

WALTER SCHOELLER.
ARTHUR SERINI.
FRIEDRICH HILDEBRANDT.
LOTHAR STRASSBERGER.
JOSEF KATHOL.
WILLY LOGEMANN.

CERTIFICATE OF CORRECTION.

Patent No. 2,323,584.  July 6, 1943.

WALTER SCHOELLER, ET AL.

It is hereby certified that error appears in the printed specification of the above numbered patent requiring correction as follows: Page 9, second column, line 9, for the words "oxidation product of" read --compound of--; and that the said Letters Patent should be read with this correction therein that the same may conform to the record of the case in the Patent Office.

Signed and sealed this 31st day of August, A. D. 1943.

(Seal)

Henry Van Arsdale,
Acting Commissioner of Patents.